United States Patent [19]

Oota et al.

[11] Patent Number: 4,977,912

[45] Date of Patent: Dec. 18, 1990

[54] FINELY PULVERIZED COMPONENT ADDED IN VEHICLE SPRAY WASHING WATER AND APPARATUS FOR RECOVERING THEREOF

[75] Inventors: Yasato Oota; Tadashi Matsumura; Takayuki Abe, all of Tokyo, Japan

[73] Assignee: Tokyo Tatsuno Co., Ltd., Tokyo, Japan

[21] Appl. No.: 347,120

[22] Filed: May 4, 1989

Related U.S. Application Data

[62] Division of Ser. No. 308,082, Feb. 9, 1989.

[30] Foreign Application Priority Data

Feb. 29, 1988 [JP] Japan ................................. 63-44290
Jun. 7, 1988 [JP] Japan ................................. 63-138462

[51] Int. Cl.$^5$ ........................................... B08B 3/02
[52] U.S. Cl. ............................. 134/104.4; 134/109; 134/123; 252/174.25; 252/140
[58] Field of Search .................... 15/3, DIG. 2, 95; 134/45, 123, 104.2, 104.4, 109; 252/174.23, 174.25, 140

[56] References Cited

U.S. PATENT DOCUMENTS

| | | | |
|---|---|---|---|
| 2,232,389 | 2/1941 | Jurkat | 15/DIG. 3 |
| 2,922,173 | 1/1960 | Lind et al. | 134/123 X |
| 3,012,262 | 12/1961 | Mori | 15/3 |
| 3,033,711 | 5/1962 | Harding | 15/95 X |
| 3,183,120 | 5/1965 | Mori | 15/3 X |
| 4,135,533 | 1/1979 | Gall et al. | 134/123 X |
| 4,804,488 | 2/1989 | Alvemarker | 15/3 X |

Primary Examiner—Frankie L. Stinson
Attorney, Agent, or Firm—Sughrue, Mion, Zinn, Macpeak & Seas

[57] ABSTRACT

A finely pulverized component added in vehicle spray washing water and acting to remove dirt which ordinarily tend to be left on a car surface when washing the car by applying dynamic water spray, and a vehicle spray washing system using the spray washing water containing detergent and the finely pulverized component, including a device for clarifying waste washing water and a device for recovering the finely pulverized component from the waste washing water to return the same to water to be sprayed.

3 Claims, 1 Drawing Sheet

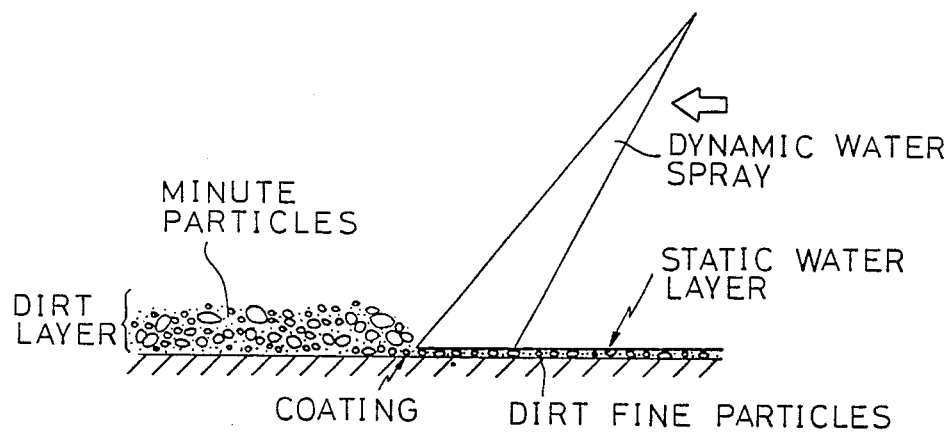
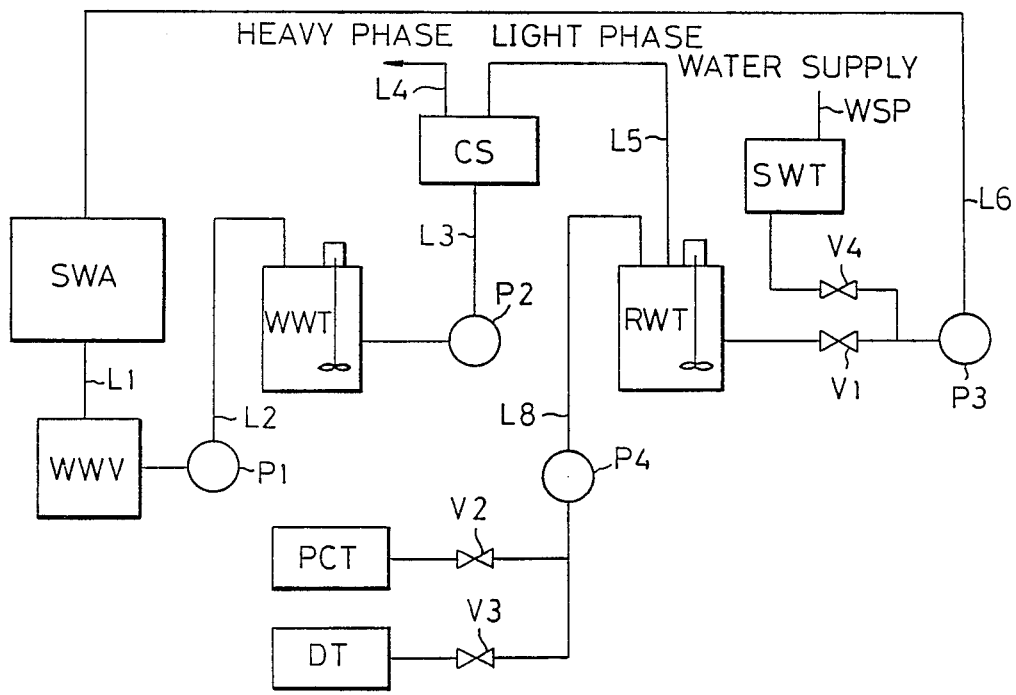
Fig.2

FINELY PULVERIZED COMPONENT ADDED IN VEHICLE SPRAY WASHING WATER AND APPARATUS FOR RECOVERING THEREOF

This is a division of application Ser. No. 07/308,082 filed Feb. 9, 1989.

BACKGROUND OF THE INVENTION AND RELATED ART

The invention relates to a finely pulverized component added in vehicle spray washing water, and more particularly for sprayingly washing out the so-called "last one film" formed on the car body surface without necessity of manual scrubbing or brushing. Further it relates to a vehicle spray washing system comprising an apparatus for recovering said finely pulverized component from waste washing water.

A car body is inevitably covered with minute dirt particles of soil, worn tire and pavement materials, dust in exhausted gas and the like bonded together and adhered on the coating surface by oily content in the atmosphere originated from incompletely combustioned fuel and asphalt, during driving. The dirt film may be washed out by spraying water generally added with a detergent such as a surface active agent, so far as the upper layer thereof is concerned.

The lower layer generally formed with more finely pulverized materials, however, can not be always readily washed out by the usual spray car washing apparatus which discharge pressure at less than 100 kg/cm$^2$, generally in ranges from 30 to 70 kg/cm$^2$. The pressure range avoids possible damage formed on the surface coating and further any other danger. Such layer is, thus, often called the "last one film", which is considered to firmly adhere on the car body surface due to van der Waals force between the minute dirt particles with each other and the body surface, static electricity and surface tension of water present in gaps formed therebetween. This last one film may be formed unexpectedly in a short time, e.g. by one day drive, which is of course varied depending on driving circumstances. As time lapses, the dirt particles are rapidly deposited thereon when the last one film is left without washing. In overcrowded conditions frequent car washings are required.

Another reason why the last one film can not be removed only by spray washing that sprayed water forms a static water sublayer on the coating surface independent from a dynamic water flow so as to protect the last one film, which may well explain the reason why manual scrubbing or brushing washing can fairly readily remove such last one film.

In order to avoid such labour and time consuming manual scrubbing or brushing, a roll-over type car washing machine has been proposed and actually used, which is provided with nozzles for spraying water with many rotatable brushes and adapted to move as a whole relative to the car. This washing machine is, however, generally disliked by drivers because the brushes sometimes hurt the coating surface of the car to form the so-called brush marks which are conspicuous particularly on the surface coated in black, red or blue and may eventually break protruding parts such as mirrors, wipers and antennas, while recessed portions can not be sufficiently washed.

Chemical washing which uses a strong alkaline or acidic chemical, it is also not liked in that such chemicals may discolor the coating and corrode various metal parts of the car and further cause the environmental problem of disposing of waste washing water.

It is noted here that there is another nature of dirt of the car body surface, which is called "stains" and formed by deterioration of wax and/or dirt infiltration in fine cracks or pinholes of the coating, and conspicuous on the body surface coated in white, already in several months, which are varied depending on the driving circumstances of the car. This can be removed by said roll-over type washing machine or said chemical washing, but the disadvantages referred to above must be expected.

In order to avoid such defects, JP-A Sho 61(1986)-190599 has proposed to spray water for washing which is added with pulverized abrasive such as diatomaceous earth, talc, zeolite, calcium carbonate, bentonite, kaolin and dolomite having particle size of 0.1–5 $\mu$m and Mohs' hardness of less than 6. This method is useful for removing "stains" every two to four months, but useless for removing "last one film", since the relatively hard pulverized abrasive is liable to hurt the coating when it collide thereagainst during the spray washing. Furthermore, such pulverized abrasive is disadvantageous in that it cannot be easily separated from the sludge or the like removed from the body surface during washing, due to its specific gravity of the value larger than 1, and therefore, it is difficult to recover the same for reuse.

SUMMARY OF THE INVENTION

An object of the invention is to provide a finely pulverized component added in vehicle spray washing water to be used for washing out the so-called "last one film" formed on the vehicle body surface without necessity of manual scrubbing or brushing, and further to a vehicle spray washing system comprising an apparatus for recovering said finely pulverized component from waste washing water.

Other objects of the invention and various advantageous effects attained thereby may be appreciated by those skilled in the art when studying the following explanation to be made hereafter in reference to the accompanying drawings.

These objects can be attained fundamentally by pulverized component added in vehicle spray washing water which is preferably added with a usual detergent such as a surface active agent, in which said component is preferably pulverized synthetic resin having a Mohs' hardness of about 1, a particle dimension of 5–30 $\mu$m and a specific gravity of less than 1, and by an apparatus for recovering such pulverized synthetic resin but of a specific gravity of less than 1 from waste washing water containing the pulverized synthetic resin and the sludge, which comprises a centrifugal separator to separate, in operation, waste washing water into the sludge to be collected in the separator, a heavy phase consisting mostly of clarified water to be discharged and a light phase containing almost all swimming pulverized component having a specific gravity of less than 1 to be discharged for reuse.

BRIEF DESCRIPTION OF THE DRAWINGS

FIG. 1 is a diagram in a large scale of a dirt film formed on the vehicle body surface, and FIG. 2 is a block diagram showing apparatus for recovering pulverized component from waste washing water according to the invention.

DESCRIPTION OF THE PREFERRED EMBODIMENTS

It has been found that when a pulverized component, preferably synthetic resin having a Mohs' hardness of about 1, a particle demension of 5–30 μm and specific gravity of less than 1 is added in spray washing water which is preferably added with a detergent to be sprayed by a usual spray car washing machine of which discharge pressure is less than 100 kg/cm², preferably in the range of about 30—about 70 kg/cm², the last one film of dirt deposited on the car body surface can be satisfactorily removed without mannual scrubbing or brushing.

FIG. 1 may be helpful for understanding the nature of such dirt film, of the lower layer thereof called the "last one film" which is different from the "stains" referred to above and of the static water sublayer referred to above of which breakthrough is made possible by pulverized component to be added in spray washing water according to the invention.

The pulverized component having the hardness, the particle dimension and the specific gravity as referred to above may be polyethylene, which is available in the market.

EXAMPLE 1

Washing water added respectively with such pulverized components were sprayed on the body surface of the care under following severe conditions to examine how far the coating is damaged.

| | | |
|---|---|---|
| 1. Sprayed water pressure | | 70 kg/cm² |
| 2. Nozzle moving rate | | 0 |
| Nozzle was not moved to spray water at the one and same area of the coating. | | |
| 3. Sprayed water volume | | 10 l/min. |
| This corresponds to 1.0 l/cm² and 400 times the sprayed water in Example 2 showing tests of the last one film removal, since the nozzle is not moved here and moved in the latter. | | |
| 4. Concentration of pulverized component | | 1.0 wt/% |
| 5. Concentration of surface active agent | | 0.2 wt/% |
| ⊙ The test results are shown in the following | | |
| ◯ Table by the symbol; | | |
| △ No damage or almost no damage | | |

EXAMPLE 2

The tests for determining how far the last one film can be removed only by spraying washing water added with the pulverized component were carried out under similar conditions but the nozzle was moved at a rate of 4 m/min. Similarly sprayed water of 10 l/min was used per one test which corresponds to 0.0025 l/cm² and consequently 250 l/10 m² which is sufficient for wholly washing one car. The test results were evaluated according to the following symbols;
  Completely removed
  Last one film remained only slightly
  Noticeably remained

| Test No. | Component | Properties Spec. Grav. | Dimen- sion (μg) | Damage | Removal |
|---|---|---|---|---|---|
| 1. | Polyethylene | 0.920 | 5 | ⊙ | △ |
| 2. | " | 0.922 | 15 | ⊙ | ⊙ |
| 3. | " | 0.922 | 20 | ⊙ | ⊙ |
| 4. | " | 0.922 | 25 | ⊙ | ◯ |

-continued

| Test No. | Component | Properties Spec. Grav. | Dimen- sion (μg) | Damage | Removal |
|---|---|---|---|---|---|
| 5. | " | 0.932 | 40 | ⊙ | △ |

Polyethylene of average particle dimensions of 15 μm and 20 μm (Nos. 2 and 3) attain satisfactory removal of the last one film without damaging the coating surface. Such pulverized polyethylene costs about 500 per kg., but in view of the specific gravity less than 1 it is easy to separate from dirt sludge precipitated in water to cyclically reused.

Pulverized polyethylene of the average particle dimensions of 5–30 μm, more preferably of 10–25 μm is, thus, most suitable as the pulverized component to be added in spray washing water according to the invention, particularly in view of that such component can be readily recovered from waste washing water to be reused.

Even if labour and time consuming manual scrubbing or brushing can be omitted according the invention, when the pulverized component added in washing water is discharged the cost thereof added in the amount of 1–5 weight % becomes to be fairly expensive.

In contrast therewith, when the specific gravity of the pulverized component is less than 1, it is very easy to recover thereof from waste washing water to be reused in many times so that the cost thereof may be one tenth or less.

Now in reference to FIG. 2 an apparatus for recovering the pulverized component to be cyclically fed to the spray car washing apparatus is explained.

A centrifugal separator represented by CS, any usually used one may be used according to the invention so far as it is of 6,000–15,000 G centrifugal force and sludge separation accuracy of less than 1.0 μm. According to such centrifugal separator CS, waste washing water exhausted from a spray washing apparatus SWA may be separated into the sludge to be collected in the separator, a heavy phase consisting mainly of clarified water and a light phase which contains pulverized component such as polyethylene in a higher concentration in water.

The spray car washing apparatus SWA, for instance, a roll-over type having a plurality of spray nozzles mounted on a gate frame moving over a car or a manual type having a spray nozzle fixed to an end of a supply hose, is connected with a waste water vessel WWV via a first conduit L1, which is then connected with a waste water tank WWT provided with an impeller stirrer via a conduit L2 to feed waste washing water once stored in the former to the latter by means of a pump P1. The stirred waste water is then fed to the centrifugal separator CS by means of a second pump P2 through a conduit L3. The heavy phase separated here is discharged in a sewer not shown via a conduit L4, while the light phase is fed to a regenerated washing water tank RWT provided with an impeller stirrer via a conduit L5.

The outlet of the regenerated washing water tank RWT is connected with the spray washing apparatus SWA via a conduit L6 through a valve V1 and a pump P3, while the inlet thereof is connected with a pulverized component tank PCT and a detergent tank DT via a conduit L8 through a common pump P4 and respective valves V2, V3.

A rinsing water tank SWT connected with a water service pipe WSP is connected through a valve V4 with said conduit L6 between the valve V1 and the pump P3 which allows the spray nozzle to spray the washing water under discharge pressure of about 30–70 kg/cm$^2$.

When car washing water is to be sprayed by the apparatus SWA, the valve V1 is opened to supply regenerated washing water from the tank RWT therefor, if necessary pulverized component and detergent are respectively resupplied thereto by opening the valves V2 and V3 and driving the pump P4 and water is added by opening the valve V4 so as to control the washing water contents and concentration thereof. When car washing is over, the valve V1 is closed and rinsing water is applied to the apparatus SWA by opening the valve V4.

EXAMPLE 3

An actual waste car washing water, which was confirmed to contain 2.0% by weight of pulverized polyethylene and 0.2% by weight of dirt particles, was subjected to the recovering apparatus according to the invention, in which a centrifugal separator of a centrifugal force of 13,000 G was used.

In case where the throughput of the waste washing water is 1200 l/h, where the discharged heavy phase is 200 l/h and where the discharged light phase is 1000 l/h, the following results are obtained.

Amount of the pulverized polyethylene in the heavy phase: less than 0.2% by weight Amount of the sludge in the heavy phase: not found Amount of the pulverized polyethylene in the light phase: More than 2.2% by weight Amount of the sludge in the light phase: not found.

This result shows that fairly expensive pulverized components inclusive of polyethylene can be commercially used in the spray car washing water.

What is claimed is:

1. A vehicle spray washing system comprising,
    a finely pulverized component added in vehicle spray washing water which may contain a detergent, in which said component has a Mohs hardness of approximately 1, a specific gravity of less than 1 and a particle dimension of 5-30 m,
    a first waste water vessel for temporally storing waste washing water and causing heavy dirt and mud in the water to sediment,
    a second waste water vessel for storing the waste water fed from the first vessel, the second vessel being provided with an impeller stirrer for stirring the waste water so as to prevent the pulverized component from swimming,
    a centrifugal separator having a centrifugal force in the range of approximately 6,000 G to 15,000 G, said centrifugal separator separating the waste water fed from the second vessel into sludge collected by said separator, a heavy phase mainly containing clarified water to be discharged in a sewer and light phase water mainly containing the pulverized component to be reused, and
    a regenerated washing water tank for storing the light phase water which is fed to a spray washing apparatus by a high pressure pump, the tank being provided with an impeller stirrer for stirring the water.
2. The system as set forth in claim 1, which further comprises means for the supplement of fresh pulverized component and detergent to the light phase in the regenerated washing water tank as occasion demands.
3. The system as set forth in claim 1, further comprises a rinsing water tank connected with an inlet port of the high pressure pump.

* * * * *